US006636936B2

(12) United States Patent
Terrill et al.

(10) Patent No.: US 6,636,936 B2
(45) Date of Patent: *Oct. 21, 2003

(54) PROGRAMMING CIRCUITS AND TECHNIQUES FOR PROGRAMMABLE LOGIC

(75) Inventors: Richard Shaw Terrill, Sunnyvale, CA (US); Robert Richard Noel Bielby, Fremont, CA (US)

(73) Assignee: Altera Corporation, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/544,379

(22) Filed: Apr. 6, 2000

(65) Prior Publication Data

US 2003/0160633 A1 Aug. 28, 2003

Related U.S. Application Data

(63) Continuation of application No. 08/709,491, filed on Sep. 6, 1996, now Pat. No. 6,052,755, which is a continuation of application No. 08/572,806, filed on Dec. 15, 1995, now Pat. No. 5,590,305, which is a continuation of application No. 08/219,688, filed on Mar. 28, 1994, now abandoned.

(51) Int. Cl.[7] .............................................. G06F 13/00
(52) U.S. Cl. ..................... 711/103; 711/100; 711/165; 711/170
(58) Field of Search ................................ 711/100, 103, 711/109, 154, 165, 170

(56) References Cited

U.S. PATENT DOCUMENTS

| | | | | | |
|---|---|---|---|---|---|
| 4,837,785 | A | * | 6/1989 | McAlpine | 370/438 |
| 5,406,627 | A | * | 4/1995 | Thompson et al. | 380/20 |
| 5,914,902 | A | * | 6/1999 | Lawrence et al. | 365/201 |
| 6,102,963 | A | * | 8/2000 | Agrawal | 716/17 |
| 6,127,843 | A | * | 10/2000 | Agrawal et al. | 326/40 |
| 6,311,149 | B1 | * | 10/2001 | Ryan et al. | 703/21 |

OTHER PUBLICATIONS

"The Programmable Gate Array Data Book", by XILINX, 1992.*

* cited by examiner

Primary Examiner—Tuan V. Thai
(74) Attorney, Agent, or Firm—Townsend and Townsend and Crew LLP

(57) ABSTRACT

Apparatus and methods for configuring a plurality of programmable logic devices which include the steps of providing a source of configuration data and transferring the configuration data directly from the source to each of the programmable logic devices. In some embodiments, the methods permit the programmable logic devices to configure themselves without the intervention of an intelligent host such as a CPU, a microcontroller, or other types of intelligent logic. In other embodiments, configuration data files are used in conjunction with an intelligent host to configure the programmable logic devices. Configuration is performed at power-up or, alternatively, under user or software control.

33 Claims, 9 Drawing Sheets

PROGRAMMING CIRCUITS AND TECHNIQUES FOR PROGRAMMABLE LOGIC

This application is a continuation of U.S. patent application Ser. No. 08/709,491, filed Sep. 6, 1996, now U.S. Pat. No. 6,052,755, which is a continuation of U.S. patent application 08/572,806, filed Dec. 15, 1995, now U.S. Pat. No. 5,590,305, which is a continuation of U.S. patent application Ser. No. 08/219,688, filed Mar. 28, 1994, now abandoned, all of which are incorporated by reference.

BACKGROUND OF THE INVENTION

This invention relates to programming techniques for configuring multiple programmable integrated logic circuits. In particular, the invention relates to improved techniques and methods to configure a plurality of programmable logic devices from nonvolatile memory.

Programmable logic devices (PLDs), sometimes referred to as PALs, PLAs, FPLAs, PLDs, FPLDs, EEPLDs, LCAs, and FPGAs, and the like are well known. PLDs allow users to electrically program off-the-shelf logic elements to meet the specific needs of their applications. Multiple PLDs can be interconnected to implement complex logic functions. As such, PLDs permit users to combine the logistical advantages of standard, fixed integrated circuits with the architectural flexibility of custom devices. Proprietary logic functions can be designed and fabricated in-house, eliminating the long engineering lead times, high tooling costs, complex procurement logistics, and dedicated inventory problems associated with custom devices.

PLDs often comprise a plurality of logic blocks and interconnections which are configurable to perform user-specified logic operations. These PLDs are often implemented using reprogrammable memory cells. One type of PLD uses reprogrammable CMOS SRAM cells to configure the logic blocks and interconnections. To enable the PLD to perform a desired logic function, the PLD must first be configured. The process of loading the programming data into one or more PLDs is called configuration. Programming or configuration data for the PLD device is often stored in a configuration EPROM device or provided to the PLD by an intelligent host such as a CPU, system controller, and the like from nonvolatile memory.

Altera Corporation of San Jose, Calif., produces a variety of PLDs such as the FLEX 8000™, described in detail in the August 1993 Datasheet, or the MAX 7000™ described in detail in the September 1991 ALTERA DATABOOK, both incorporated herein for all purposes. Altera also produces software and hardware tools to simplify the design of complex logic circuits using PLDs. Further references can be made to the documentation which accompanies the MAX+PLUSII™ development system, Altera Logic Programmer Card, and the Master Programming Unit. The use of the aforementioned hardware and software tools for designing PLDs is common knowledge to those of skill in the art.

Traditional designs permit the configuration of a single PLD on power-up. However, as logic functions grow more complex, multiple PLDs are frequently used to implement the logic circuitry. From a circuit designer's perspective, it is highly desirable to implement configuration using a circuit which can efficiently configure multiple PLDs while keeping overhead configuration circuitry to a minimum to save space and costs.

The use of reprogrammable memory cells to implement PLDs also permits on-demand reconfiguration. Unlike power-on configuration schemes, on-demand reconfiguration permits the user or the software to dynamically reconfigure an entire system using configuration data stored on nonvolatile media. The PLDs can be reconfigured when triggered by a predefined condition, such as the detection of a momentary power failure. On-demand configuration enables the user to perform in-circuit upgrades and modifications without having to remove the PLDs from the application circuity. Reconfigurability also permits the user to reuse the logic resources of the PLD instead of designing redundant or duplicate circuitry into the system. For some applications, timing considerations require that the configuration circuitry accomplishes on-demand reconfiguration of the PLDs with a minimum time delay.

There is thus a need for improved configuration circuits and techniques, which are simple, inexpensive, and efficient, for configuring multiple PLDs. The circuitry preferrably accomplishes reconfiguration in a minimum amount of time and adaptable to either on-demand or power-up configuration.

SUMMARY OF THE INVENTION

The present invention relates to apparatus and methods for configuring a plurality of programmable logic devices. The configuration method includes the steps of providing a source of configuration data and transferring via a direct data path the configuration data from the source to each programmable logic device. In one embodiment, the source of configuration data is preferably one or more nonvolatile memory chip such as an EPROM, EEPROM, and the like. In another embodiment, the configuration data is stored in one or more configuration data files on magnetic and/or optical memory. Depending on which configuration circuit or method is selected, the configuration of the programmable logic devices is accomplished in a parallel, sequential, or interleaved manner.

DESCRIPTION OF THE PREFERRED EMBODIMENT

Figure 1:
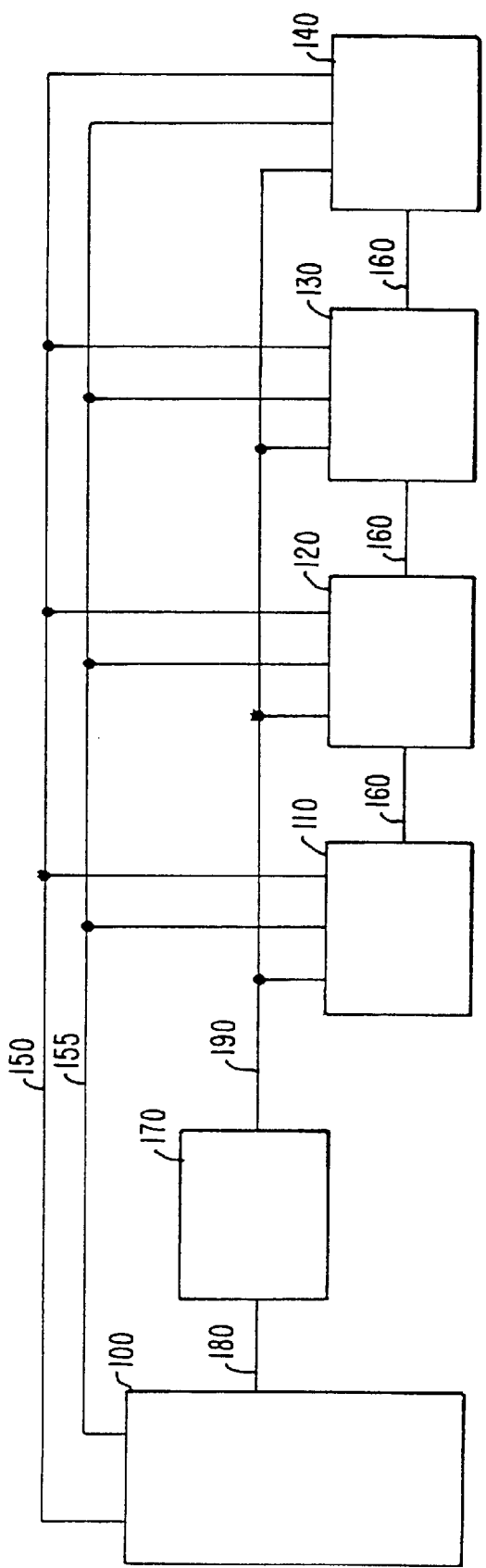
FIG. 1 is a high level diagram of the configuration circuitry.

FIG. 1 is a high level diagram of the improved configuration circuit. A nonvolatile memory 100, such as a ROM, EPROM, EEPROM, magnetic or optical media, and the like, holds the configuration data for configuring a plurality of PLDs. Upon power-up or on demand, memory 100 transfers the stored configuration data to a plurality of PLD devices 110–140 via a data bus 150. Each of PLDs 110–140 uses the transferred configuration data to configure itself by programming the appropriate internal logic and/or interconnections. A data clock line on bus 155 synchronizes the data transfer between memory 100 and each of PLD devices 110–140.

FIG. 1 also shows a control bus 160 between PLDs 110–140. Control bus 160 includes lines carrying control signals among the PLD devices. In one sequential configuration scheme, these control signals are used to synchronize PLD devices 110–140 during configuration.

There is shown an. optional control circuit 170 between memory 100 and PLD devices 110–140. Optional control circuit 170 represents a microprocessor, microcontroller, dedicated PLD, and the like, and helps facilitate data transfer between memory 100 and each of PLDs 110–140. A bus 180 couples control circuit 170 with memory 100 while a bus 190 couples control circuit 170 with each of PLD devices 110–140. Buses 180 and 190 include the address and control lines to effect addressing and control of PLDs 110–140 during configuration.

Control signals on buses 155, 160, and 190 permit the PLDs in certain configuration schemes to configure simultaneously. Other schemes configure the PLD devices sequentially while some permit interleaved configuration. The implementation details of the various configuration schemes of the present invention are fully described below in connection with FIGS. 2–11.

MULTIPLE DEVICE CONFIGURATION— ACTIVE PARALLEL HYBRID (MD-APH)

Figure 2:
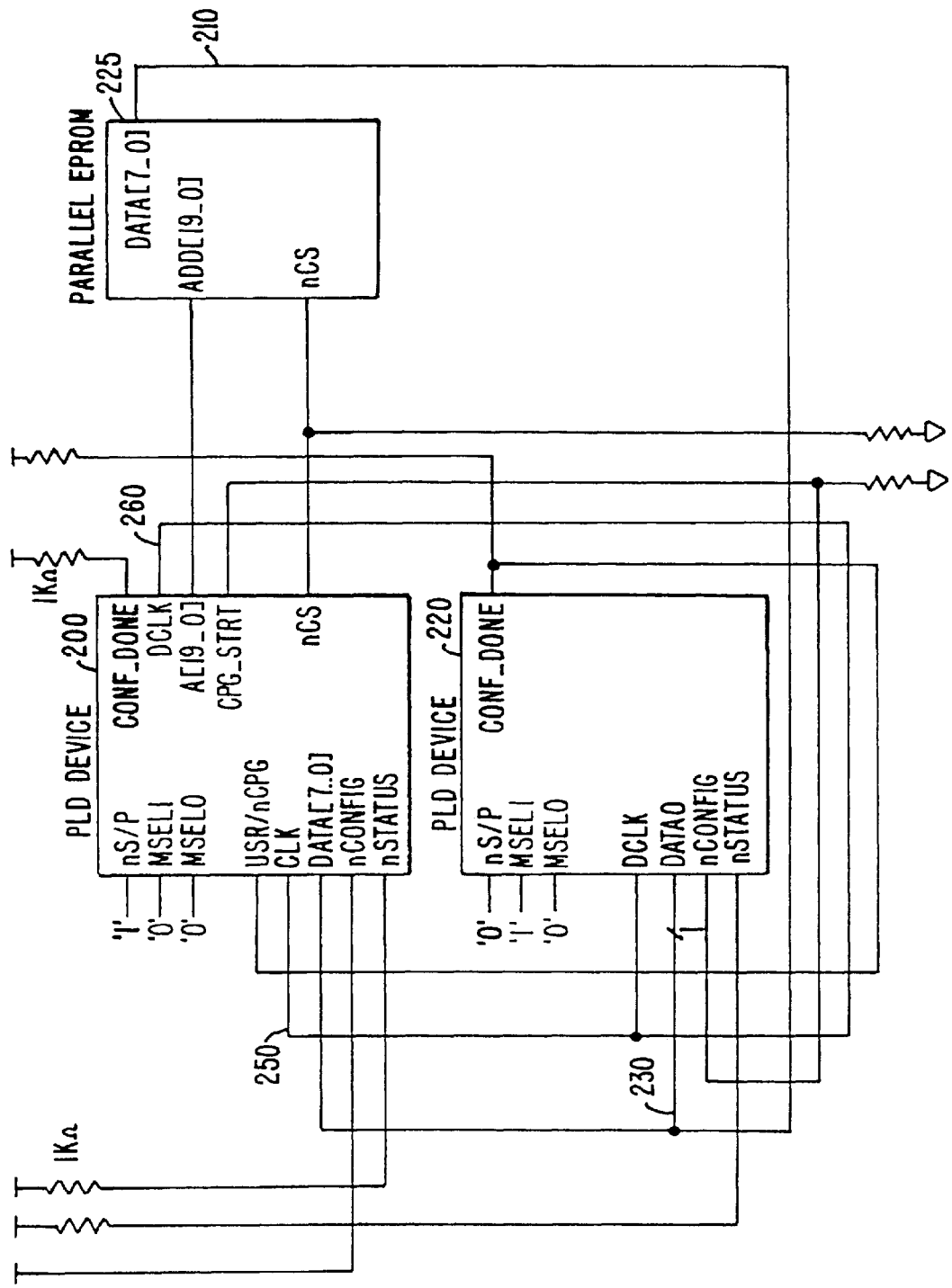
FIG. 2 shows a simplified configuration circuit using a Active Parallel Hybrid (MD-APH) technique.

FIG. 2 shows a configuration circuit for configuring a plurality of PLDs using the active parallel hybrid technique. Referring to FIG. 2, the configuration circuit includes two PLDs 200 and 220. There is a parallel EPROM 225 for storing the configuration data for PLDs 200 and 220. PLD 200 uses an active parallel up (APU) configuration technique to configure itself while PLD 220 uses a passive serial bit-slice (PS) configuration technique.

Upon power up, a data bus 210 transfers configuration data from parallel EPROM 225 to PLD 200. PLD 200 then proceeds to initialize itself using the configuration data from EPROM 225. When PLD 200 is fully configured, PLD 200 asserts a signal CFG_STRT, thereby passing a signal nCONFIG to all subsequent PLD devices.

The assertion of CFG_STRT by PLD 200 enables each of the subsequent PLD devices to begin loading its own configuration data from parallel EPROM 225. Except for PLD 200, all other PLD devices to be configured receive their configuration data serially from a respective data line of data bus 210. As seen in FIG. 2, PLD 220 is coupled to a data line 230 (DATA0) off data bus 210. After receiving the nCONFIG signal, PLD 220 begins to serially load its own configuration data from EPROM 225 via data line 230 (DATA0) to configure itself.

It should be noted that although FIG. 2 shows only two PLDs 200 and 220, it is possible to have up to N+1 PLDs per configuration circuit, where N represents the number of data lines in data bus 210. For example, the configuration circuit of the present embodiment includes eight data lines [DATA0–DATA7] on data bus 210. Consequently, there may be up to nine PLD devices in the configuration circuit of FIG. 2. One of these nine PLD devices is coupled to all data bit lines [DATA0–DATA7] of data bus 210 to implement APU configuration while each of the other eight is coupled to a respective unique individual data line off data bus 210.

PLD 200 contains a configuration support macro function. The macro function, designed using Altera's MAX+ PLUSII™ design system, contains a state machine that controls the configuration process. The macro function also controls logic to gate the nCONFIG signals of the other PLDs and a 20-bit counter that addresses parallel EPROM 225. The macro function further implements multiplexing of address pins A[17–0] which are coupled to address lines into parallel EPROM 225. Pins A[19–18] on PLD 200 serve as I/O pins and are similarly multiplexed. These address and I/O pins are connected to the support logic during configuration via the macro function-implemented multiplexers. Once configuration is completed, the user-mode logic will connect to these twenty pins via the above-mentioned multiplexers. Consequently, these address and I/O pins are not wasted when configuration is completed.

The bit-slice configuration data from EPROM 225 appears to PLD 220 as a parallel stream of serial configuration data. As mentioned earlier, the macro function design file for PLD 200 contains support logic with a 20-bit counter as well as logic that facilitates configuration of the passively configured PLD 220 by emulating the address generation normally seen in the active parallel configuration.

The configuration circuit in FIG. 2 shows two Altera PLD devices EPF81188 being configured from a parallel EPROM. There may be up to eight passively configured PLD devices in the configuration circuit utilizing a 256K byte-wide EPROM. The first 32K bytes store the active parallel up (APU) data for the actively configured device, i.e., PLD 200. The next 192K bytes contain the bit-slice configuration data for the passively. configured PLD devices. Depending on the EPROMs chosen, PLD devices of different sizes may be accommodated.

On PLD 200, the nCONFIG input is tied to VCC. This causes PLD 200 to initialize upon power up. Alternatively the nCONFIG pin on PLD 200 is connected to a user-controlled or software-controlled logic signal, permitting configuration on demand. In the present embodiment, a HIGH-LOW transition on the nCONFIG line resets the PLD device, and a subsequent LOW-HIGH transition starts the configuration. Because the nCONFIG signal of PLD 220 is coupled to the CFG_STRT signal of PLD 200, PLD 220 does not start to configure until PLD 200 is fully configured and asserts its CFG_STRT signal. In one embodiment, configuration proceeds automatically at a minimum of 2 MHz (bit-rate). On each PLD, the nSTATUS pin is pulled up to VCC via a pull-up resistor. The present embodiment uses a plurality of 1 KΩ resistors to pull up the nSTATUS pins.

PLD 200 will complete its own configuration before the other PLD devices. Consequently, the CONF_DONE signal of PLD 200 is not tied to the CONF_DONE net which is coupled to all other PLD devices. This arrangement permits the support logic in PLD 200 to direct the configuration of the passively configured devices even after configuration of PLD 200 is done. Once all PLD devices in the circuit are configured, PLD 200 enters user mode. As discussed, the configuration address pins A[17–0] and two I/O pins A[19–18] remain unavailable until the entire set of PLDs has been configured.

The CLK input 250 to PLD 200 is tied to the DCLK output 260 of PLD 200. This is necessary since the address counter and state machine must be driven by DCLK, and DCLK is not available internally. The USR/nCFG input on PLD 200 is tied to the CONF_DONE net of the passively configured PLD devices, e.g., PLD 220. Once the passively configured PLD devices are all configured and release their CONF_DONE, the assertion of a USR/nCFG input to PLD 200 turns off the address counter and reassigns those output pins to user pins. This action also causes PLD 200 to assert a high level on nCS, disabling EPROM 225, and latches CFG_STRT at VCC to prevent erroneous reconfiguration.

Although the technique is not limited to any particular type of PLD, APU configuration of PLD 200 is selected by setting pins nS/P, MSEL1, and MSEL0 to 1, 0, and 0 respectively on the FLEX 8000™ of the present embodiment. passive serial bit-slice configuration of PLD 220 is selected by setting pins nS/P, MSEL0, and MSEL1 to 0, 1, and 0 respectively. In this and all subsequent configuration circuits, the setting of these pins can be done by hardwiring each pin to its appropriate logic level or by coupling it to a control signal. The latter advantageously permits the user or the software to easily switch among the configuration schemes depending on need simply by changing the settings of the n/SP, MSEL0, and MSEL1 pins.

As is apparent from the foregoing, the multi-device active parallel hybrid (MD-APH) technique does not require an intelligent host or external logic. As a consequence, the MD-APH configuration scheme is easy to implement, thereby enabling PLD users to reduce the time-to-market for their products. Further, the MD-APH configuration scheme uses a space-efficient parallel EPROM, and permits concurrent configuration of the passive devices. Concurrent configuration reduces the time delay associated with configuring multiple devices and allows the PLDs to be configured with greater efficiency.

MULTIPLE DEVICE CONFIGURATION—SEQUENTIAL ACTIVE SERIAL (MD-SAS)

Figure 3:
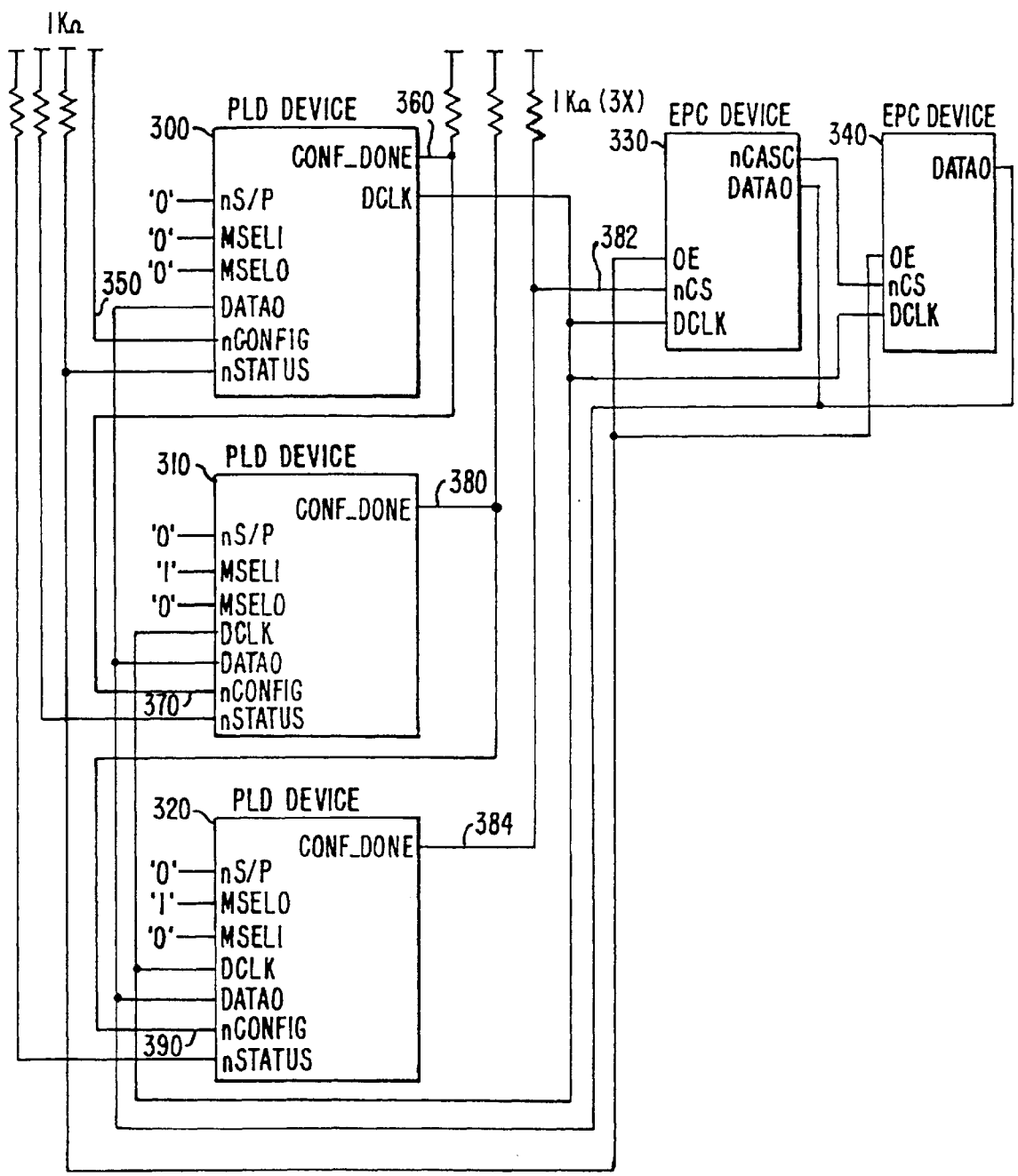
FIG. 3 shows a simplified configuration circuit using a Sequential Active Serial (MD-SAS) technique.

Referring to FIG. 3, the configuration data for the PLDs 300, 310, and 320 are stored in serial configuration EPROMs 330 and 340. Although the technique is not limited to any particular type of PLD, sequential active serial configuration of the PLD set is selected by setting the nS/P, MSEL1, and MSEL0 pins on PLD 300 to 0, 0, 0 respectively. On subsequent PLDs, the nS/P, MSEL1, and MSEL0 pins are set to 0, 1, and 0 respectively. The nCONFIG pin 350 on PLD 300 is tied to VCC, causing the entire set of PLD devices to initialize on power-up. As in the MD-APH circuit, the nCONFIG pin on the first PLD device, i.e., pin 350, is alternatively connected to a user-controlled or software-controlled logic signal, permitting on-demand reconfiguration. A HIGH-LOW transition on nCONFIG pin 350 resets the PLD device, and a subsequent LOW-HIGH transition starts the configuration period. In one embodiment, configuration proceeds automatically at a minimum of 2 MHz.

PLD 300 controls the configuration by generating a DCLK signal which serially clocks out data from the EPROMs. A CONF_DONE pin 360 of PLD 300 is connected to the nCONFIG pin 370 of the next PLD device, e.g., PLD 310. When PLD 300 is fully configured, CONF_DONE pin 360 pulls up to VCC (through the external pull-up resistor), and this LOW-HIGH transition on the nCONFIG input to the next PLD device, e.g., pin 370, directs PLD 310 to begin configuration. This connection scheme is repeated through the entire set of PLD devices. For example, the CONF_DONE pin 380 of PLD 310 is connected to the nCONFIG pin 390 of PLD 320 in FIG. 3 to permit configuration of PLD 320 when configuration of PLD 310 is finished.

Although FIG. 3 shows three PLDs 300, 310, and 320, there is theoretically no limit on the number of PLDs that can be configured using the MD-SAS technique. Instead of the EPROMs of FIG. 3, configuration data can be stored on other nonvolatile data storage media, e.g., hard disks, to supply configuration data to a large number of PLDs. In FIG. 3, the configuration files for the PLDs are combined and stored in two EPROM devices thus saving one EPROM. When EPROMs are used, the number of PLDs and EPROMs may vary depending on their respective sizes.

In one embodiment, more than six PLDs are connected in a MD-SAS configuration circuit. In such case, it may be advisable to provide external active buffering for the DCLK and DATA0 nets to ensure that signal integrity is maintained. The nCS pin 382 on the first EPROM device, e.g., EPROM 330, must be connected to the CONF_DONE pin 384 of the last PLD device. In this manner, the EPROM devices will all be disabled once the last PLD device is completely configured and asserts its CONF_DONE.

As is apparent from the foregoing, the MD-SAS configuration circuit does not require an intelligent host. The technique flexibly adapts to a wide variety of EPROMs or other types of nonvolatile storage and advantageously enables any number of PLDs to configure serially either during power-up or on demand.

MULTIPLE DEVICE CONFIGURATION—ACTIVE SERIAL BIT-SLICE (MD-ASB)

Figure 4:
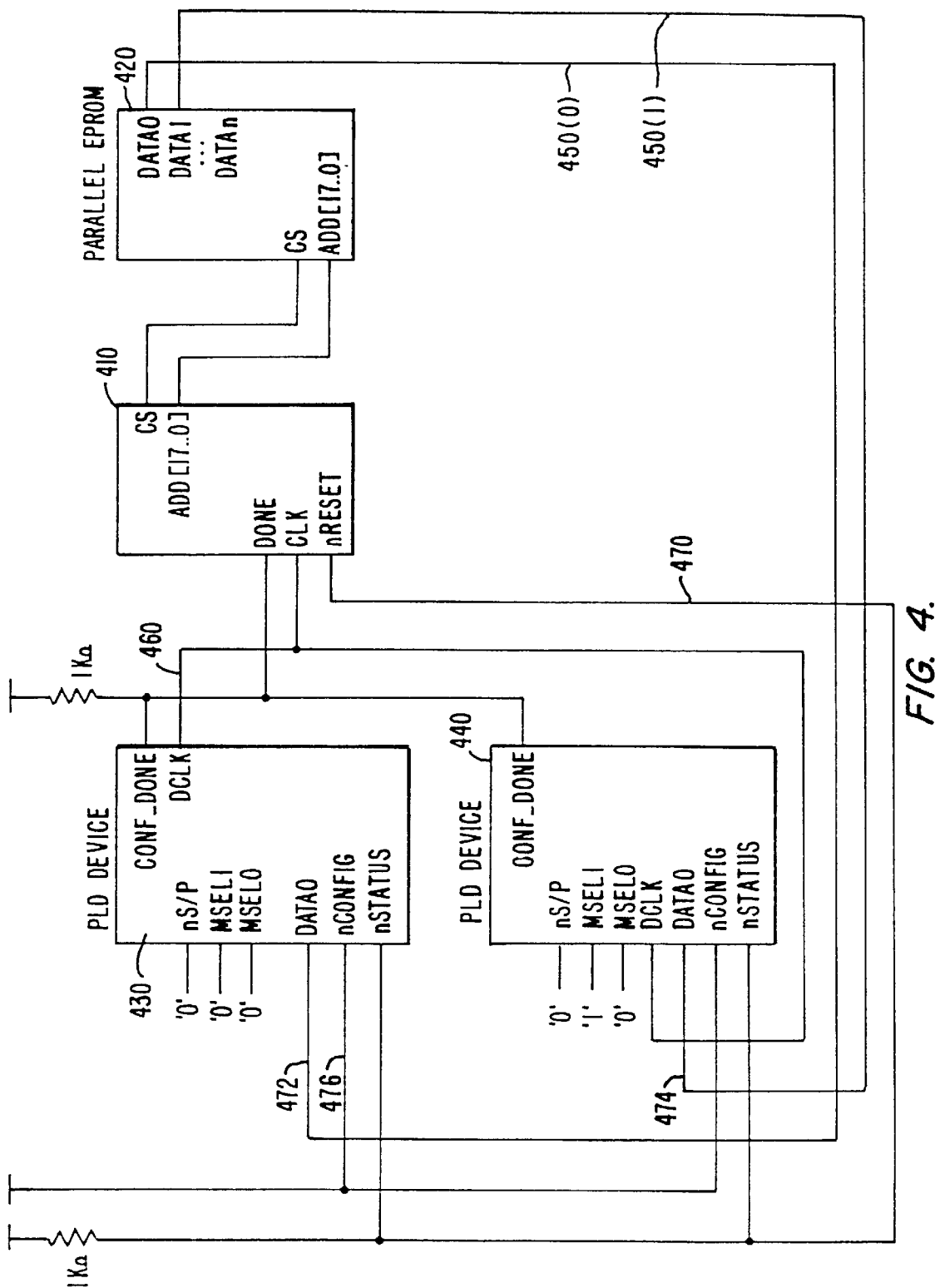
FIG. 4 is a simplified schematic diagram of a configuration circuit using a Active Serial Bit-Slice (MD-ASB) technique.

FIG. 4 is a simplified schematic diagram of a MD-ASB configuration circuit. Although the technique is not limited to any particular type of PLD, active serial bit-slice configuration is selected by setting the nS/P, MSEL1, and MSEL0 pins on PLD 430 to 0, 0, 0 respectively, and pins nS/P, MSEL1, and MSEL0 on subsequent PLDs in the set to 0, 1, and 0 respectively on the FLEX 8000™ devices in the present embodiment Referring to FIG. 4, the configuration data for PLDs 430 and 440 is stored in a parallel EPROM 420. Each bit in a data word from EPROM 420 configures a different PLD device in the set. In the present embodiment, there are 8 data lines from EPROM 420. Each data line is coupled to a unique PLD in the configuration circuit. The configuration data from EPROM 420 on 8 data lines 450(0)–450(N) appears to the PLD devices as parallel streams of serial configuration data.

Upon power up or on demand, the first PLD device, i.e., PLD device 430, generates a DCLK signal 460 which is translated by a support circuit 410 into sequential addresses for EPROM 420. In one embodiment, support circuit 410 is implemented by a preprogrammed PLD. Support circuit 410 contains an 18-bit counter, and logic to translate the nSTATUS signal on line 470 into a global reset.

The present embodiment uses an Altera EPM7032 PLD to implement support circuit 410. In one embodiment, the necessary functions of the support PLD are defined by the following Altera Hardware Description Language (AHDL) codes using the Altera MAX+PLUSII™ development system.

TABLE 1

```
DESIGN IS asbpld
                DEVICE IS EPM7032LC44;
SUBDESIGN asbpld
{
        CLK, DONE, nRESET    :INPUT;
        CS, ADD[17..0]       :OUTPUT;
}
VARIABLE
        count[17..0]         :DFF;
        atri[17..0]          :TRI;
BEGIN
        ADD[]                =atri[];
        atri[]               =count[];
        atri[].oc            =GLOBAL(!DONE);
        CS                   =!DONE;
        count[].clk          =GLOBAL(CLK);
        count[].clm          =GLOBAL(nRESET);
        count[].d            =count[].q+1;
END;
```

Each data line from EPROM 420 is coupled to a DATA0 pin of a corresponding PLD device in the configuration set. Referring to FIG. 4, DATA0 pin 472 of PLD device 430 is connected to the DATA0 pin of EPROM 420 via data line 450(0). In a similar manner, DATA0 pin 474 of PLD device 440 is connected to the DATA1 pin of EPROM 420 via data line 450(1).

Although FIG. 4 shows only two PLD devices in a MD-ASB circuit, the invention is not so limiting. There can be as many PLD devices as there are data lines in a given parallel EPROM. For example, up to 8 PLD devices may be simultaneously configured in the configuration circuit of FIG. 4 using a standard byte-wide EPROM.

The nCONFIG net from the PLD devices is tied to VCC, causing the entire set of PLD devices to initialize on power-up. To implement on-demand configuration, the nCONFIG net is connected to a user-controlled or software-controlled logic signal. A HIGH-LOW transition on the nCONFIG line resets the PLD device, and a subsequent LOW-HIGH transition starts the configuration period.

The nSTATUS net is pulled to VCC via a pull-up resistor, and is also connected to the reset input on support circuit 410. This active low nRESET signal is pulled to GND prior to configuration to reset the address counter. The nRESET signal is supplied by the HIGH-LOW-HIGH pulse that occurs on the nSTATUS pin whenever a PLD device configuration cycle is started.

This same pulse also occurs on the nSTATUS line whenever an error condition is encountered either during operation or configuration. When an error is encountered either during operation (e.g., bad data is encountered) or during configuration (e.g., VCC failure), the PLD devices drive the nSTATUS net with a HIGH-LOW-HIGH transition. This pulse resets the counter in support circuit 410, and directs the PLD devices to reconfigure. To provide this capability, the "auto-restart configuration on frame error" must be enabled in the "FLEX 8000 individual device options" dialogue box using, for example, the MAX+PLUSII™ development system.

The CONF_DONE net is held low by the PLD devices until all devices in the configuration set are configured. This particular arrangement advantageously allows PLD devices of different sizes to be configured simultaneously.

As is apparent, the MD-ASB configuration circuit does not require an intelligent host. Besides being simple, the MD-ASB circuit is also efficient. In one embodiment, space-efficient parallel EPROMs are advantageously used. Concurrent configuration of the PLD devices results in fast configuration. As discussed, all PLD devices are initialized simultaneously, and there is support for auto-reconfiguration on error during either operation or configuration.

MULTIPLE DEVICE CONFIGURATION—PASSIVE SERIAL BIT-SLICE METHOD (MD-PSB)

In the MD-PSB system, the configuration data is typically stored in a data file in a suitable storage medium, such as RAM, ROM, magnetic and/or optical media, and the like. Although the technique is not limited to any particular type of PLD, passive serial bit-slice configuration is selected by setting the nS/P, MSEL1, and MSEL0 pins to 0, 1, and 0 respectively on the FLEX 8000™ devices of the present embodiment. The configuration data is presented to PLD devices 510 and 520 by an intelligent host 530. Intelligent host 530 represents, for example, a microcontroller, a microprocessor, or other types of intelligent logic.

Figure 5:
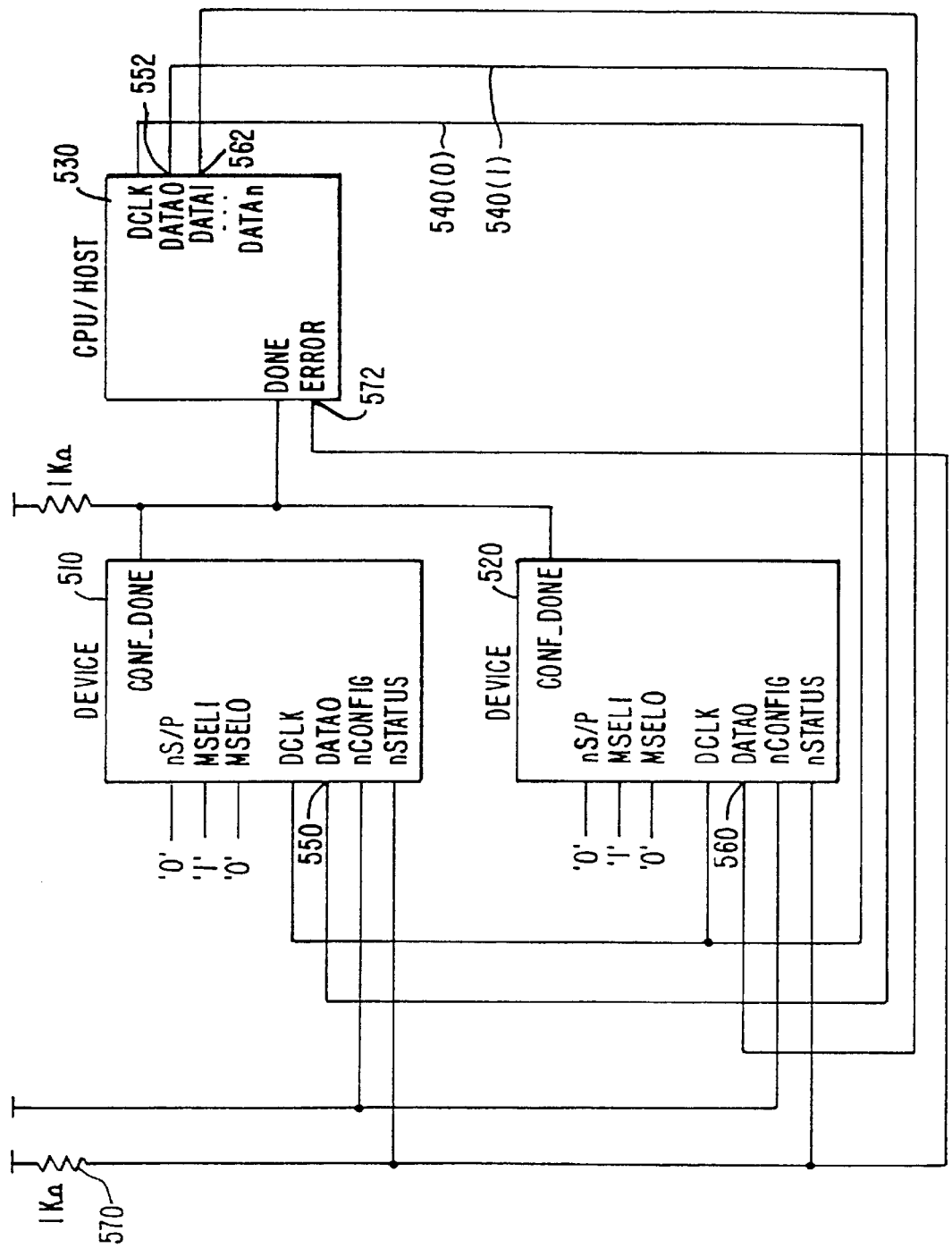
FIG. 5 shows a simplified configuration circuit using a Passive Serial Bit-Slice (MD-PSB) technique.

The configuration data in the stored data file is presented to PLD devices 520 and 530 as parallel streams of serial configuration data. Each data bit in the 8-bit wide configuration file configures a different PLD device, with each data bit in a data word being directed to the DATA0 pin of a different PLD device in the configuration set. Referring to FIG. 5, DATA0 pin 550 of PLD 510 is connected to a DATA0 pin 552 of intelligent host 530 via data line 540(0). In a similar manner, the DATA0 pin 560 of PLD device 520 is connected to a DATA1 pin 562 of intelligent host 530 via data line 540(1). Once a configuration data word is present on the data bus, intelligent host 530 sends a DCLK pulse to all PLDs, directing the PLDs to latch the data bit on the respective line in the bus.

FIG. 5 shows two PLD devices 510 and 520 in a MD-PSB configuration circuit. It should be noted that the circuit may be extended to configure more than two PLD devices per configuration data file. For example, up to 8 unique PLD devices may be configured by intelligent host 530 in the configuration circuit of FIG. 5. Furthermore, it should be readily apparent to those of ordinary skill in the art that multiple files may be used to extend this configuration circuit without limit. If desired, the DATA0 pin on each PLD device is reserved so that it will not be used during user mode. Reservation can be easily accomplished by selecting the "FLEX 8000 individual device options" dialogue box using the MAX+PLUSII™ development system.

In FIG. 5, the nCONFIG net is tied to VCC, causing the entire set of PLD devices to initialize on power-up. Alternatively, the nCONFIG net is coupled to a user-controlled or software-controlled logic signal to implement on-demand configuration. A HIGH-LOW transition on the nCONFIG net resets the PLDs, and a subsequent LOW-HIGH transition starts the configuration period.

The nSTATUS net is pulled to VCC via a pull-up resistor 570, and connected to an input port 572 on intelligent host 530. If an error is encountered either during configuration or operation, the nSTATUS net is pulled and held low by the PLDs until intelligent host 530 starts a reconfiguration cycle by pulling nCONFIG low and then releasing it.

Figure 6:
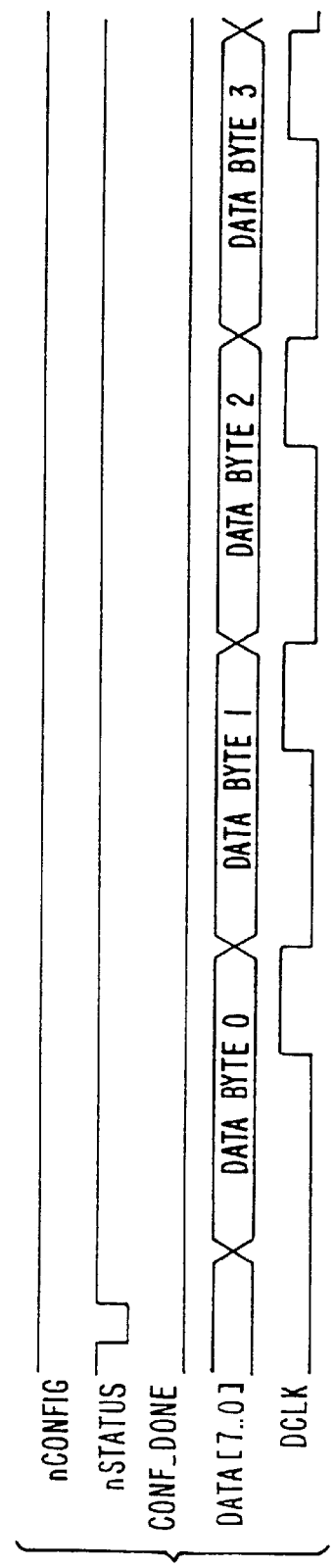
FIG. 6 is a timing diagram of the signals generated by the circuit of FIG. 5.

The CONF_DONE net is held low until all devices are configured. The DONE input on intelligent host 530 provides an indication that configuration has been successful. FIG. 6 illustrates the signals generated by the circuit of FIG. 5 during configuration.

As is apparent from the foregoing, the MD-PSB configuration circuit advantageously makes use of the intelligent host on the system, and uses data files which facilitates easy in-field upgrades. The data files can be stored in a mass storage medium instead of on the board, thereby reducing the system chip count. The MD-PSB configuration circuit, like all passive configuration circuits herein, flexibly supports multiple sources of configuration data. The ability to configure from among multiple data sources is particularly desirable for real-time reconfiguration. Multiple sources increase the reuseability of the logic resources of the system by giving the user the option to reconfigure the logic from a variety of configuration files depending on need.

Furthermore, the use of external data sources makes it easy for manufacturers to upgrade their products by supplying the end users with configuration data on diskettes or tapes. Configuration is fast since the MD-PSB configuration circuit configures all PLD devices concurrently, and initializes all devices simultaneously.

MULTIPLE DEVICE CONFIGURATION—PASSIVE PARALLEL SYNCHRONOUS (MD-PPS)

In the MD-PPS configuration circuit, the configuration data is typically stored in a data file in a suitable storage medium, such as RAM, ROM, magnetic and/or optical media, and the like. Although the technique is not limited to any particular type of PLD, passive parallel synchronous configuration is selected by setting the nS/P, MSEL1, and MSEL0 pins to 1, 0, and 1 respectively on the FLEX 8000™ devices of the present embodiment.

Figure 7:
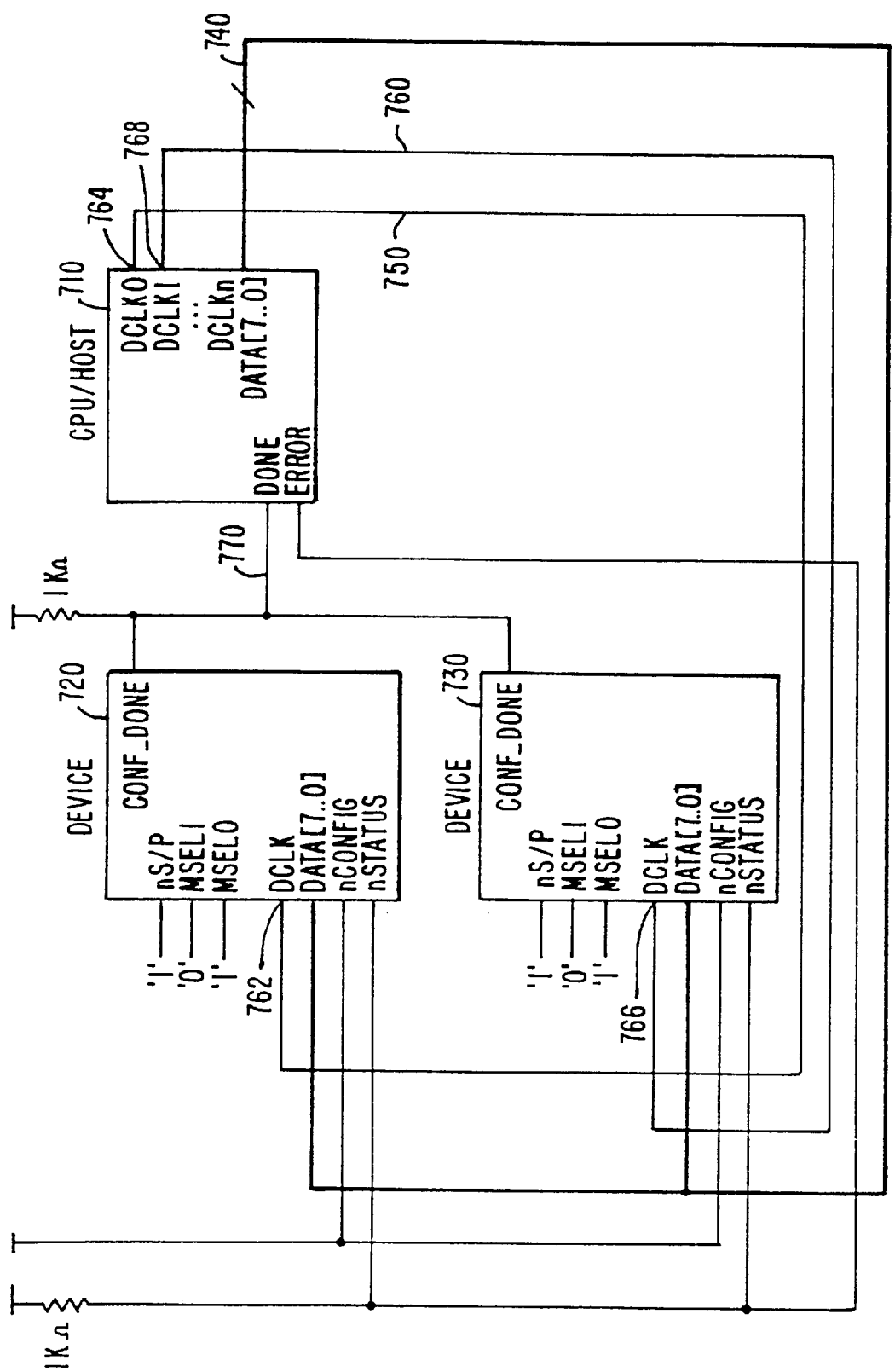
FIG. 7 shows a simplified configuration circuit using a Passive Parallel Synchronous (MD-PPS) technique.

Referring to FIG. 7, the configuration data is retrieved by an intelligent host 710 and presented to PLDs 720 and 730 in a parallel format. Intelligent host 710 represents, for example, a microcontroller, a microprocessor, or other types of intelligent logic. If the host is a CPU or intelligent logic, a dedicated data register can be implemented using an octal latch.

On power-up or on demand, intelligent host 710 retrieves the stored configuration data and transfers them to each of the PLDs in the set via a data bus 740 which comprises lines DATA[N–0]. N is 7 in the 8-bit wide data bus in the circuit of FIG. 7.

The DCLK pin on each PLD is connected to a respective DCLK pin on intelligent host 710. For example, a DCLK pin 762 on PLD 720 is connected to a DCLK0 pin 764 on intelligent host 710 via a line 750. Similarly, a DCLK pin 766 on PLD 730 is connected to DCLK1 pin 768 of host 710 via a line 760. Intelligent host 710 selects which one of the PLD devices 0–N receives the data word on data bus 740 by asserting one of its signals DCLK[N–0].

In the MD-PPS configuration circuit, each PLD device receives the entire data word in parallel from intelligent host 710. The same data bus 740 connects intelligent host 710 to each of the PLDs. Intelligent host 710 may configure PLD devices 0–N sequentially, i.e., completely configuring one PLD device before initiating configuration of another PLD device. Alternatively, intelligent host 710 may configure the PLDs in the set in rotation, i.e., interleaving the PLD devices, with each PLD receiving one or more data words in a rotation.

Although FIG. 7 shows two PLD devices 720 and 730 in the configuration set, this configuration scheme may be extended to configure more. It is contemplated that the scheme configures one PLD device per each unique DCLK signal that can be generated by intelligent host 710.

The nCONFIG net is tied to VCC, causing the entire set of PLD devices to initialize on power-up. Alternatively, the nCONFIG net is connected to a user-controlled or software-controlled logic signal to implement configuration on demand.

A HIGH-LOW transition on the nCONFIG net resets the PLDs, and a subsequent LOW-HIGH transition starts the configuration period. In one embodiment, intelligent host 710 configures the PLD devices at a bit rate of 2 MHz (one 8-bit byte per 8 DCLK transitions).

The nSTATUS net is pulled to VCC via a pull-up resistor and connected to an input on intelligent host 710.

If an error is encountered either during configuration or operation, the nSTATUS net is pulled and held low by the PLDs until host 710 starts a reconfiguration cycle by pulling nCONFIG low and then releasing it. The CONF_DONE net is held low until all the PLDs are configured. The DONE signal 770 on host 710 provides an indication that configuration has been successful.

Figure 8:
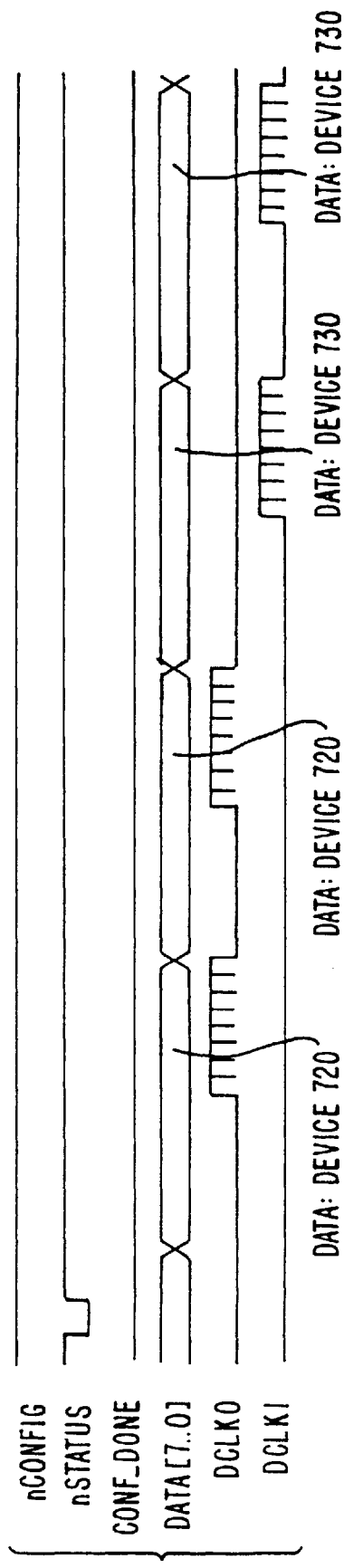
FIG. 8 is a timing diagram of the signals generated during a non-interleaved configuration cycle using the circuit of FIG. 7.
Figure 9:
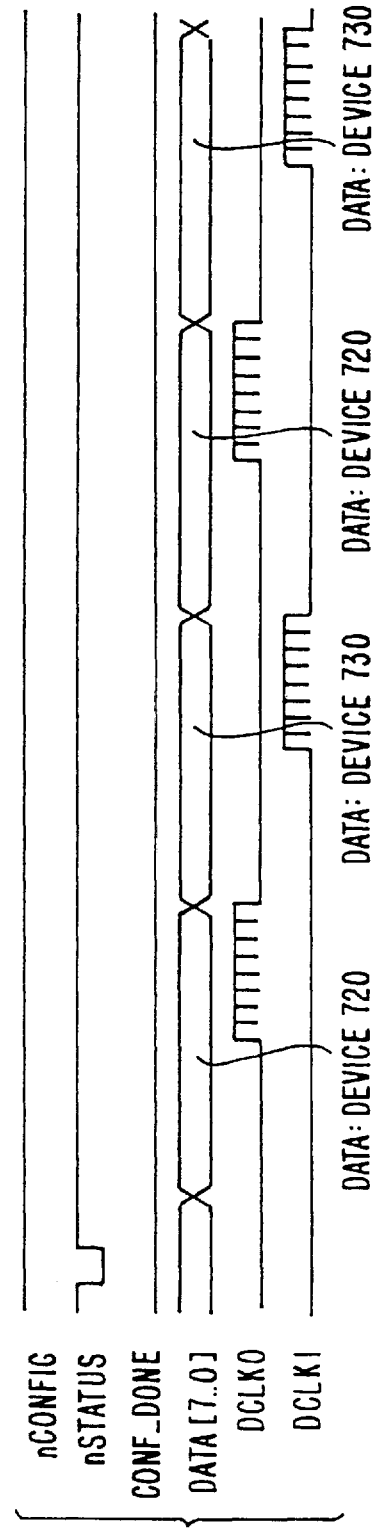
FIG. 9 is a timing diagram of the signals generated during a interleaved configuration cycle using the circuit of FIG. 7.

FIG. 8 is a timing diagram for the signals generated when PLD devices 720 and 730 are configured in a non-interleaved sequence. FIG. 9 is a different timing diagram showing the signals generated when the PLDs of FIG. 7 are configured in an interleaved configuration.

As is apparent from the foregoing, the MD-PPS configuration circuit takes advantage of the intelligent host in the-system and uses data files which facilitates easy in-field upgrades. The data files can be stored in a mass storage medium instead of on the board, thereby reducing the system chip count. The MD-PPS configuration circuit, like all passive configuration circuits herein, flexibly supports multiple sources of configuration data. Furthermore, the use of external data sources makes it easy for manufacturers to upgrade their products by supplying the end users with configuration data on diskettes or tapes.

MULTIPLE DEVICE CONFIGURATION—PASSIVE PARALLEL ASYNCHRONOUS METHOD (MD-PPA)

Figure 10:
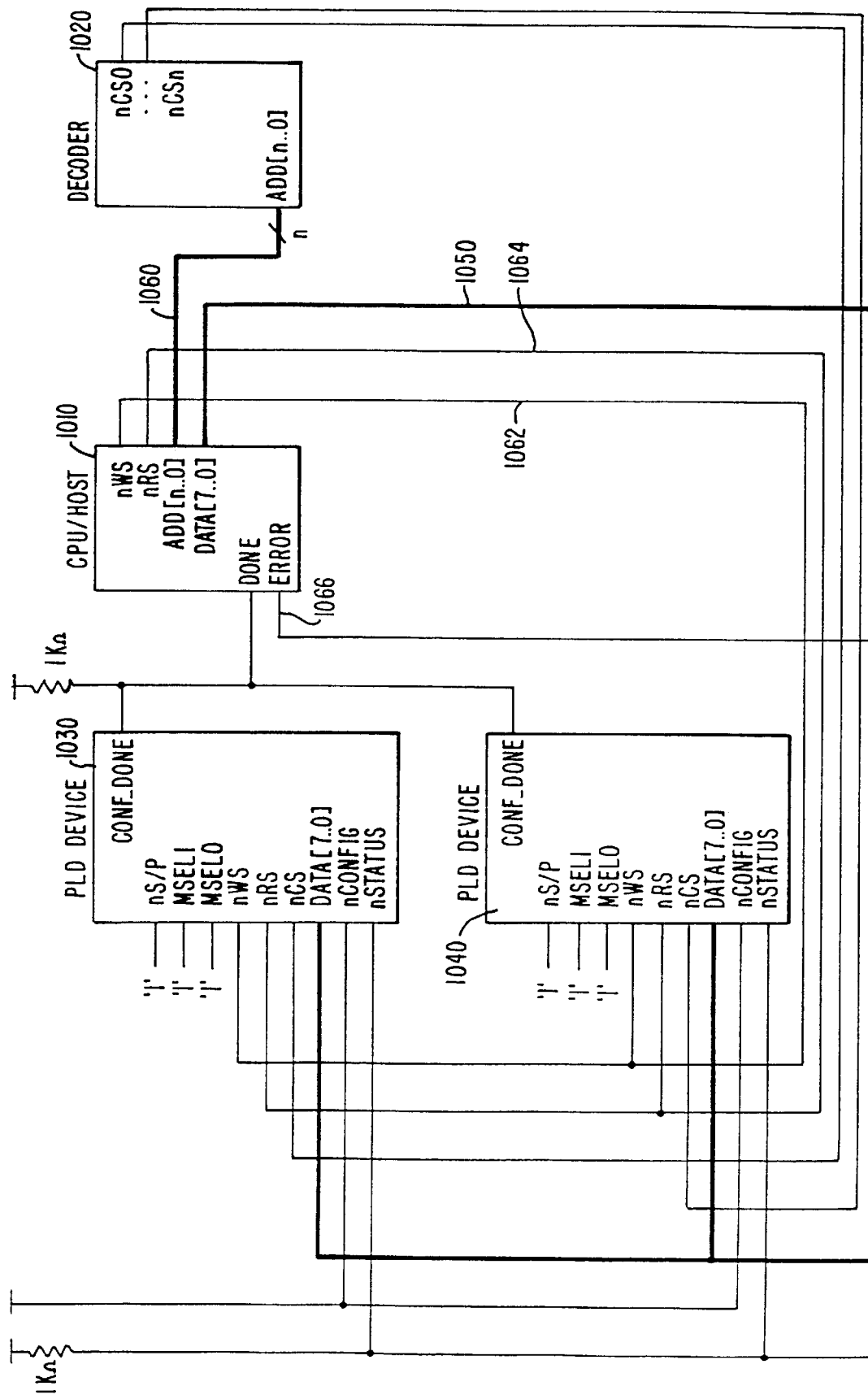
FIG. 10 is a simplified schematic diagram of a configuration circuit using a Passive Parallel Asynchronous (MD-PPA) technique.

In the MD-PPA configuration circuit, the configuration data is typically stored in a data file in a suitable storage medium, such as RAM, ROM, magnetic and/or optical media, and the like. Referring to FIG. 10, an intelligent host 1010 retrieves the configuration data from memory and presents the configuration data to PLDs 1030 and 1040 in a parallel format via a data bus 1050. Intelligent host 1010 represents, for example, a microcontroller, a microprocessor, or other types of intelligent logic. Although the technique is not limited to any particular type of PLD, passive serial asynchronous configuration is selected by setting the nS/P, MSEL1, and MSEL0 pins to 1, 1, and 1 respectively on the FLEX 8000™ devices of the present embodiment PLD devices 1030 and 1040 are coupled to the data lines of data bus 1050. A decoder 1020 translates the address generated by intelligent host 1010 into chip select signals for each PLD 1030 and 1040. In one embodiment, decoder 1020 is implemented through the use of another programmable logic device. However, decoder 1020 is not part of the logic resources to be configured by the configuration circuit of FIG. 10.

Decoder 1020 selects the appropriate PLD device to latch the data word present on data bus 1050 by enabling that PLD to clock in its own configuration data from intelligent host 1010. The MD-PPA circuit configures each individual PLD device completely before the next PLD starts configuration. Alternatively, the configuration may be interleaved, with each PLD receiving one or more data words in rotation from bus 1050 and intelligent host 1010. In one embodiment, the invention uses the interleaving method to take advantage of the FLEX 8000™ device's four-microsecond (250 KHz) minimum configuration time per byte. In another embodiment, sequential configuration is employed to accommodate a slow bus.

In the MD-PPA scheme, each PLD device is uniquely addressed by decoder PLD 1020. When intelligent host 1010 is ready to present a data word to a particular PLD device, e.g., PLD device 1030, host 1010 generates the address corresponding to that device and transmits that address to decoder 1020 via an address bus 1060. Decoder 1020 selects the PLD device that corresponds to the address sent by intelligent host 1010 using the appropriate nCS[n] pin. Intelligent host 1010 then uses the falling pulse on the nWS signal on line 1062 to direct the selected PLD device to latch the configuration data word present on data bus 1050.

A pulse on a nRS line 1064 directs the addressed PLD device to present the RDYnBSY signal on the DATA 7 pin. DATA 7 pin can thus be monitored to determine when the PLD device is ready to receive another byte of data. It should be noted that other schemes of monitoring when the PLD device is ready to receive another byte of data are well known to those of ordinary skill in the art without departing from the scope of the present invention.

Although FIG. 10 shows two PLD devices in the configuration set, it is possible to extend the configuration circuit to configure a greater number of PLDs. Up to one PLD device for each uniquely decodable address may be implemented using the MD-PPA scheme. To further increase the capacity of the MD-PPA configuration circuit, multiple decoders may be used to select among a greater number of PLD devices. In other words, there are no upper limits to the number of PLD devices that may be configured using this scheme.

The nCONFIG net is tied to VCC, causing the entire set of PLD devices to initialize on power-up. Alternatively, the nCONFIG net can be connected to a user-controlled or software-controlled logic signal to implement on-demand configuration. A HIGH-LOW transition on the nCONFIG net resets the PLD devices, and a subsequent LOW-HIGH transition starts the configuration period.

The nSTATUS net is pulled to VCC via a pull-up resistor, and is connected to an input port on intelligent host 1010. If an error is encountered either during configuration or operation, the nSTATUS net is pulled and held low by the PLDs until host 1010 starts a reconfiguration cycle by pulling nCONFIG low and then releasing it. The CONF_DONE net is held low until all PLD devices are configured. The DONE input on host 1010 provides an indication that configuration has been successful.

FIG. 10 shows an ERROR input 1066 to intelligent host 1010. This ERROR input 1066 is monitored for a HIGH-LOW transition on the nSTATUS net. The HIGH-LOW transition indicates the presence of an error, either during operation or during configuration. Intelligent host 1010 can then respond by initiating a reconfiguration cycle by pulling nCONFIG low, and then releasing it.

Figure 11:
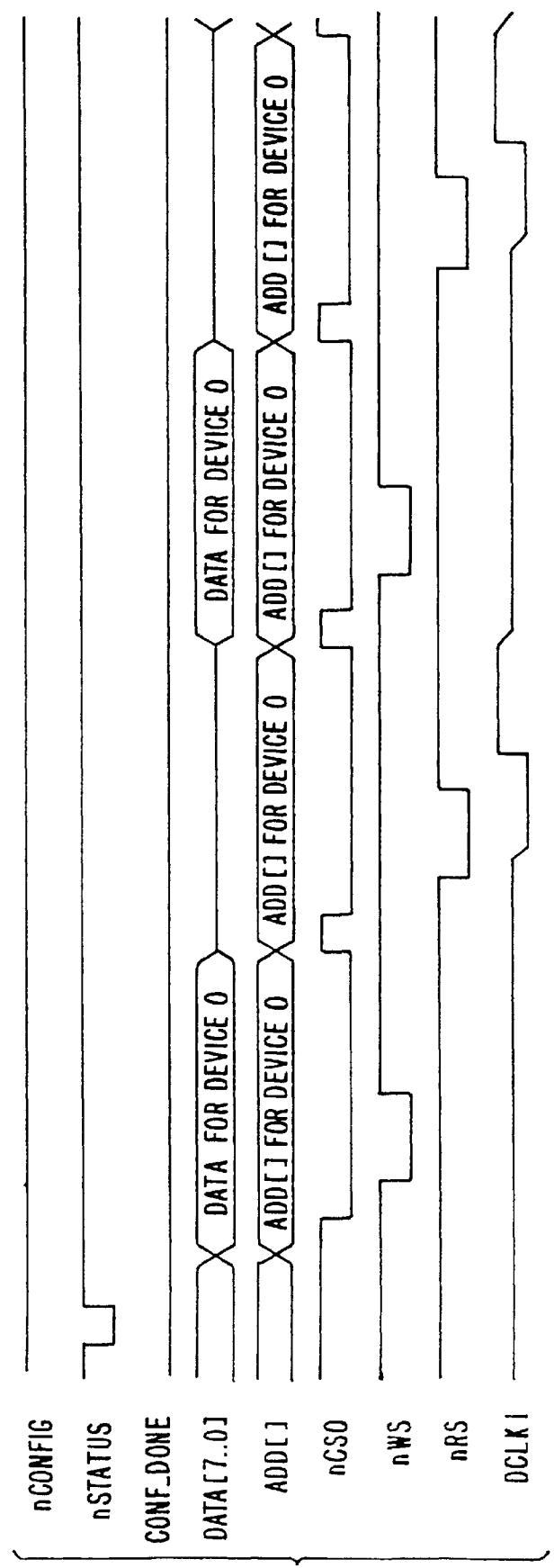
FIG. 11 is a timing diagram of the signals generated during a non-interleaved configuration cycle using the circuit of FIG. 10.

FIG. 11 shows the configuration control signals generated if the PLD devices in the MD-PPA configuration circuit are configured in a non-interleaved configuration, with optional status checking done using nRS pin 1064. Although not shown, an interleaved MD-PPA configuration circuit analogous to that described in connection with the MD-PPS circuit and FIG. 9 can readily be constructed by those of skill in the art given this disclosure.

As is apparent from the foregoing, the MD-PPA configuration circuit advantageously employs the intelligent host already existing in the system. Furthermore, the MD-PPA scheme uses data files to store configuration data, facilitating easy in-field upgrades. The data files can be stored in a mass storage medium instead of on the board, thereby reducing the system chip count.

The MD-PPS configuration circuit, like all passive configuration circuits herein, flexibly supports multiple sources of configuration data. Furthermore, the use of external configuration data sources makes it easy for manufacturers to upgrade their products by supplying the end users with configuration data on diskettes or tapes. With multiple decoders, there are theoretically no upper limits on the number of devices that can be configured per MD-PPA configuration circuit.

It will be understood that the foregoing is merely illustrative of the principles of the invention, and that various modifications can be made by those skilled in the art without departing from the scope and spirit of the invention. Accordingly, the foregoing disclosure is intended to be illustrative, but not limiting, of the scope of the invention which is set forth in the following claims.

What is claimed is:

1. A method of programming a plurality of programmable logic devices, comprising:
   providing a source of configuration data;
   generating a plurality of clock signals from the source of configuration data, each of the plurality of clock signals coupled to a respective one of the plurality of programmable logic devices;
   transferring the configuration data to the plurality of programmable logic devices, each in response to the respective one of the plurality of clock signals; and
   configuring the plurality of programmable logic devices with the configuration data, wherein a first set of the configuration data used to configure a first programmable logic device of the plurality of programmable logic devices is different from a second set of the configuration data used to configure a second programmable logic device of the plurality of programmable logic devices.

2. The method of claim 1 wherein the configuring of the first programmable logic device is interleaved with the configuring of the second programmable logic device.

3. The method of claim 1 wherein the transferring the configuration data comprises:
   transferring the first set of the configuration data to the first programmable logic device via a first direct path; and
   transferring the second set of the configuration data to the second programmable logic device via a second direct path.

4. The method of claim 1 wherein the configuration data is transferred to the plurality of programmable logic devices concurrently.

5. The method of claim 1 wherein the configuration data is transferred to the plurality of programmable logic devices in a form of parallel bits.

6. The method of claim 1 wherein the configuration data is transferred to the plurality of programmable logic devices in a stream of serial bits.

7. A method of programming a plurality of programmable logic devices comprising:
   providing a source of configuration data;
   generating a plurality of control signals;
   selectively transferring configuration data to each of the plurality of programmable logic devices, wherein each programmable logic device is selectable using a respective one of the plurality of control signals; and configuring the plurality of programmable logic devices with the configuration data, wherein a first set of the configuration data used to configure a first programmable logic device of the plurally of programmable logic devices is different from a second set of the configuration data used to configure a second programmable logic device of the plurality of programmable logic device.

8. The method of claim 7 wherein during the selective transfer, configuration data is transferred to the plurality of programmable logic devices by multiple parallel bits.

9. The method of claim 7 wherein the generating a plurality of control signals comprises:

receiving an address from the source of configuration data; and decoding the address to generate the plurality of control signals.

10. The method of claim 7 wherein the plurality of programmable logic devices is directly coupled to the source of configuration data.

11. A method of configuring a plurality of programmable logic devices comprising:

providing a microprocessor;

transferring a first set of configuration data using a first path from a first pin of the microprocessor to a first programmable logic device;

configuring at least a portion of the first programmable logic device with the first set of configuration data;

transferring a second set of configuration data using a second path from a second pin of the microprocessor to a second programmable logic device; and configuring at least a portion of the second programmable logic device with the second set of configuration data.

12. The method of claim 11 wherein the first set of configuration data is transferred to the first programmable logic device in parallel with the second set of configuration data to the second programmable logic device.

13. The method of claim 11 wherein the second set of configuration data does not pass through the first programmable logic device.

14. The method of claim 11 further comprising:

generating a clock signal using the microprocessor; and providing the clock signal to the first and second programmable logic devices.

15. The method of claim 11 wherein the first set of configuration data is transferred in serial to the first programmable logic device.

16. The method of claim 15 wherein the second set of configuration data is transferred in serial to the second programmable logic device.

17. The method of claim 11 wherein the first pin of the microprocessor is directly coupled to a data pin of the first programmable logic device.

18. The method of claim 17 wherein the second pin of the microprocessor is directly coupled to a data pin of the second programmable logic device.

19. The method of claim 11 wherein the first programmable logic device is configured concurrently with the second programmable logic device.

20. A method for configuring a plurality of programmable logic devices, comprising:

providing a source of configuration data, wherein the source comprises a digital processor;

generating a first clock signal from the digital processor;

generating a second clock signal from the digital processor;

retrieving configuration data into the digital processor;

in response to the first clock signal generated by the digital processor, transferring via a first direct data path a first set of configuration data from the digital processor to a first programmable logic device;

configuring at least a portion of the first programmable logic device with the first set of configuration data;

in response to the second clock signal generated by the digital processor, transferring via a second direct data path a second portion of the first set of configuration data from the digital processor to a second programmable logic device; and configuring at least a portion of the second programmable logic device with the second portion of the first set of configuration data.

21. The method of claim 20 further comprising:

enabling a given programmable logic device, in response to an assertion of its respective chip select signal, to receive its respective configuration data transferred from the digital processor.

22. The method of claim 20 wherein the transferring via a first direct data path is in parallel.

23. The method of claim 20 wherein the transferring via a second direct data path is in parallel.

24. A method for configuring a plurality of programmable logic devices, comprising:

providing a source of configuration data;

transferring in parallel a first set of configuration data directly from the source to a first programmable logic device;

configuring at least a portion of the first programmable logic device with the first set of configuration data;

transferring in parallel a second set of configuration data directly from the source to a second programmable logic device; and configuring at least a portion of the second programmable logic device with the second set of the configuration data, wherein the configuring at least a portion of the first programmable logic device is interleaved with the configuring at least a portion of the second programmable logic device, and the first programmable logic device may be partially configured when the second programmable logic device is partially configured.

25. The method of claim 24 further comprising:

enabling a given programmable logic device, responsive to an assertion of its respective chip select signal, to receive its respective configuration data transferred from the source.

26. The method of claim 24 wherein the transferring the configuration data to a first programmable logic device is interleaved with the transferring configuration data to a second programmable logic device, wherein the first programmable logic device may be partially configured when the second programmable logic device is partially configured.

27. A method for configuring a plurality of programmable logic devices, comprising:

providing a source of configuration data;

transferring in parallel, a first set of the configuration data from the source to a first programmable logic device;

configuring at least a portion of the first programmable logic device with the first set of configuration data;

transferring in parallel a second set of configuration data directly from the source to a second programmable logic device; and configuring at least a portion of the second programmable logic device with the second set of the configuration data, wherein the transferring the configuration data to a first programmable logic device is interleaved with the transferring the configuration data to a second programmable logic device, and the first programmable logic device may be partially configured when the second programmable logic device is partially configured.

28. The method of claim 27 wherein the source of configuration data comprises a microprocessor.

29. The method of claim 27 further comprising:

generating a first clock signal from the source of configuration data, wherein the transferring in parallel a first set of configuration data is in response to the first clock signal; and generating a second clock signal from the source of configuration data, wherein the transferring in parallel a second set of configuration data is in response to the second clock signal.

30. A method for configuring a plurality of programmable logic devices, comprising:

providing a source of configuration data, wherein the source comprises a digital processor;

retrieving configuration data into the digital processor;

serially transferring via a first direct data path a first set of configuration data, from a first data port of the digital processor to a first programmable logic device;

configuring at least a portion of the first programmable logic device with the first set of configuration data;

serially transferring via a second direct data path, a second set of configuration data, from a second data port of the digital processor to a second programmable logic device; and configuring at least a portion of the second programmable logic device with the second set of configuration data.

31. The method of claim 30 wherein the configuring the first programmable logic device occurs concurrently with the configuring the second programmable logic device.

32. The method of claim 31 further comprising using the digital processor to reconfigure the plurality of programmable logic devices upon detection of error by the digital processor.

33. The method of claim 30 further comprising:

generating a clock signal from the digital processor, wherein the serially transferring via a first direct data path and serially transferring via a second direct data path are in response to the clock signal.

* * * * *